United States Patent [19]

Watanabe

[11] 3,805,239

[45] Apr. 16, 1974

[54] PATTERN TREATING APPARATUS

[75] Inventor: Sadakazu Watanabe, Kawasaki, Japan

[73] Assignee: Tokyo Shibaura Electric Co., Ltd., Saiwai-ku, Kawasaki, Japan

[22] Filed: Jan. 24, 1973

[21] Appl. No.: 326,527

[30] Foreign Application Priority Data

Jan. 24, 1972 Japan .................................. 47-8257

[52] U.S. Cl. .................................. 340/146.3 MA
[51] Int. Cl. .................................. G06k 9/12
[58] Field of Search ......... 340/146.3 MA, 146.3 AC

[56] References Cited

UNITED STATES PATENTS

| | | | |
|---|---|---|---|
| 3,706,071 | 12/1972 | Gray | 340/146.3 MA |
| 3,522,586 | 8/1970 | Kiji et al. | 340/146.3 MA |

FOREIGN PATENTS OR APPLICATIONS

| | | | |
|---|---|---|---|
| 1,124,130 | 8/1968 | Great Britain | 340/146.3 MA |
| 732,757 | 4/1966 | Switzerland | 340/146.3 MA |

*Primary Examiner*—Thomas A. Robinson
*Attorney, Agent, or Firm*—Flynn & Frishauf

[57] ABSTRACT

A pattern treating apparatus comprising a memory device for storing in the matrix form electrical signals corresponding to the gray levels of the respective picture elements of a pattern, the gray level being divided into a plurality of unit steps between white and black levels of each element; a device for successively reading out of said memory device electrical signals representing a matrix pattern such as a 3 × 3 matrix pattern consisting of nine picture elements in total, eight of which are arranged around the central one, and determining the differenes between the gray level of the central picture element and those of the eight surrounding picture elements to obtain a sum of these differences. A device is provided for adding up all differential sums of various matrices containing a given picture element as the central one as calculated out by said summing device, carrying out the similar addition of all differential sums of various matrices containing another picture element as the central one and, after completing such addition with respect to numerous matrices in which different picture elements constitute the central one, detecting the gray level of that picture element taken as the central one which gives a maximum value from among the totals of differential sums thus computed. A device is further provided for reading out of said memory device data on a prescribed gray level higher or lower than the gray level of maximum value used as a threshold value.

10 Claims, 13 Drawing Figures

| | | |
|---|---|---|
| $X_i^4$ | $X_i^3$ | $X_i^2$ |
| $X_i^5$ | $X_i$ | $X_i^1$ |
| $X_i^6$ | $X_i^7$ | $X_i^8$ |

PATTERN TREATING APPARATUS

BACKGROUND OF THE INVENTION

This invention relates to a pattern treating apparatus used in recognizing a pattern and more particularly to a pattern treating apparatus for recognizing a pattern from the distribution of its gray level or brightness.

The process of detecting and singling out the required portion of a two-dimensional pattern according to the light and shade presented by said pattern is indispensable to treatment of information on patterns associated with, for example, biomedicine, nuclear physics, aeronautic photographic survey, and judgement of face pictures.

Unlike the recognition of specific characters and notations, treatment of general patterns is accompanied with the difficulties that not only objects of observation vary in the shape, size and position in the field of view, color and light and shade, but also such objects present numerous complicated and indistinct outlines which make it difficult to estimate typical forms. Therefore, great demand is made for an effective method of detecting and singling out a required portion from an observed pattern. To this end, it is effective to distinguish the gray levels of general patterns. For example, in biological microscopic photographs and aeronautic photographs, objects of observation generally have an obscure outline in which the light and shade only slightly vary. Accordingly, such outline can be distinguished only by recognizing the general difference between the light and shade.

The methods known to date of detecting and singling out a required fractional portion representing an object of observation from such plain pattern are the following two types, one of which consists in defining an outline bearing a relatively large difference between the light and shade from an observed pattern by means of the known spatial differentiation and detecting and singling out said outline. The other type utilizes the distribution of light and shade in a selected fractional portion of an observed pattern and detecting and singling out a required outline representing an object of observation by treatment of threshold values, thereby distinguishing said object outline from the fractional portion of the observed pattern.

The former spatial differentiation method is further divided into a primary and a secondary differentiation type. The primary differentiation type determines the different gray levels or differential values of the adjacent picture elements of a plain pattern occurring in a direction in which said gray levels most sharply vary or in another specified direction. In the primary differentiation process, the differentiation coefficient of a maximum inclination of the gray level distribution may be expressed as $$[(\partial f/\partial x)^2 + (\partial f/\partial y)^2]^{1/2}$$

where $x,y$ = values on the co-ordinate axes of picture elements $f$ = gray levels of picture elements In contrast, the secondary differentiation process determines the value of the following equation:

$$\nabla^2 f = (\partial^2 f/\partial x^2) + (\partial^2 f/\partial y^2)$$

This process uses scalar amounts easy to handle and adopts a differential value having a maximum absolute value at a point where the gray level varies, thus offering advantage in detecting a required outline. Since, however, the secondary differentiation process is subject to the harmful effect of noise, it is necessary to provide proper means for removing noise.

A common drawback to these primary and secondary differentiation processes is that an outline defined by differentiation does not always indicate a closed curve. For example, a region bearing a relative distinct general contrast to the surrounding regions may sometimes present an obscure boundary therewith. Where the first mentioned region indicates a more indistinct contrast due to occurrence of stains, cuts or thinning portions from the effect of noise, it will fail to present a fully continuous outline. Though it may be contemplated to supplement the lacking portions of an outline by arbitrarily extending the adjacent portions or uniformly broadening the thinning portions thereof, information of such defective portions is already lost and consequently any arbitrary replenishment of an imperfect outline will give rise to considerable confusion in subsequent treatment of information. This is the essential drawback accompanying the treatment of patterns by the aforesaid primary and secondary differentiation processes Further, an important problem with the treatment of a threshold value used in the latter secondary differentiation process is how said threshold value should be determined. In general plain patterns, an absolute gray level often varies and a picture element representing a given gray level appears in different frequencies (hereinafter referred to as the "gray level distribution") from one region to another of a pattern, presenting difficulties in defining a standard threshold value. Therefore, it has been proposed to use different threshold values according to the form of the gray level distribution of a pattern. The known processes of treating such varying threshold values are the P tile process and mode process. The former P tile process is the one which, where a region representing an object of observation occupies an already known proportion of a two dimensional pattern, selects a proper gray level of threshold value from a gray level distribution curve. This P tile process is set forth in an article entitled "Operation Useful for Similarity-Invariant Pattern Recognition" by W. Doyle, JACM NO. 9, p. 259, Apr., 1962. This latter mode process is the one which, where a gray level distribution curve has two clearly different two peaks for a desired region and other regions included in a pattern, uses the gray level of an intervening portion between both peaks and a threshold value. For this mode process, refer to a paper entitled "Automatic Cloud Interpretation" by A. Rosenfeld, Photogrammetric Engineering No. 31, p. 991, Nov. 1965.

These known threshold value treating processes are effective where an object outline occupies a small proportion in an entire pattern or has a distinctly different gray level distribution from that of said entire pattern. Where, however, these conditions are not fully met, namely, where an object outline presents a varying, extremely small or large proportion relative to an entire pattern, causing substantially no peak or only one peak to appear in a gray level distribution, then the abovementioned threshold value treating processes fail to be used.

SUMMARY OF THE INVENTION

It is accordingly the object of this invention to provide a pattern treating apparatus which is effective to detect and single out an object outline from general patterns in which it indicates an indistinct form and occupies an unestimable proportion to an entire field of view.

The pattern treating apparatus of this invention essentially consists of means for detecting and singling out an object outline by treating a threshold value, namely, automatically selecting an optimum threshold value by means of spatial differentiation for an observed pattern being treated.

In the pattern treating apparatus of this invention, a two-dimensional pattern being treated is divided into numerous minute picture elements by a photoelectric converter. In this case, a certain number of picture elements disposed near to each other are grouped into a matrix form. Differences between the gray level of the central picture element of said matrix and those of the surrounding picture elements are determined by the known spatial differentiation method, thereby obtaining a sum of gray level differences, which is referred to as a primary differential sum. The gray level is divided into a plurality of unit steps between the white and black levels of each element. Further, there are provided various matrices in which the same picture element is used as the central one, thus obtaining a plurality of differential sums for said various matrices. All balances between said plural differential sums are collectively taken as a secondary differential sum. For the object of this invention, there is used either the primary or secondary differential sum. These primary and secondary differential sums are calculated for numerous matrices in which different picture elements constitute the central one, thus obtaining a total of such differential sums for each different gray level represented by the central picture elements of numerous matrices. From among the totals of such differential sums there is selected the gray level which will indicate a maximum expected value (later described) of the differential sum. The gray level having said maximum expected value is used as a threshold value in detecting and singling out an object outline from an original two-dimensional pattern.

There will now be given the reason why the threshold value thus obtained is most adapted to detect and single out an object outline from a two-dimensional pattern. Now let a two-dimensional pattern X be expressed by the following equation:

$$x = (x_i)$$

which is obtained by quantizing a limited number of stepwise gray levels of picture elements included in said pattern. In the above equation, i denotes an integer and $x_i$ represents the gray level of a picture element occupying the order of $i$ among the picture elements constituting a fractional matrix form of the original two-dimensional pattern.

Now let a group of picture elements surrounding the central one of said matrix form be designated as K and the gray level of a picture element occupying the order of $k$ among said group K be represented by $x_i^k$. In FIG. 2, the group K consists of picture elements 1 to 8, $d_i^k$ representing a primary differential value which may be expressed by the following Equation 2 or 2' using the aforesaid gray levels $x_i$ and $x_i^k$:

$$d_i^k = (x_i - x_i^k) \cdot 1\ (x_i - x_i^k - \theta) \quad (2)$$

$$d_i^k = (x_i^k - x_i) \cdot 1\ (x_i^k - x_i - \theta) \quad (2)'$$

where:

$1\ (x)$ = a function of a unit gray level step $\theta$ = a constant

In this connection, it will be noted that in case of $x > 0$, $1(x)$ will have a value of 1 and in case of $x \leqq 0$, a value of 0.

Now let a primary differential sum be indicated by $S_i'$ which is obtained by adding up the differences between the gray level of the picture element occupying the order of $i$ among the group of K and those of the other adjacently surrounding picture elements included in said group K. Then said primary differential sum $S_i'$ may be expressed as follows:

$$S_i' = \sum_{k \in K} d_i^k \quad (3)$$

The primary differential sum $S_i'$ is a function of the gray level $x_i$. Therefore, a plurality of primary differential sums $S_i'$ of various matrices in which each of many different picture elements with the same gray level constitutes the central one may be totaled by the following equation:

$$\sigma_j = \sum_{i \in C_j S_i'} S_i' \quad (4)$$

where:

$C_j$ = a group of picture elements in a pattern $X$ as classified on the basis of gray level $j$ = gray level expressed in an integer as 1 to $m$ The term $\sigma_j$ of the above Equation 4 is hereinafter referred to as a "total of differential sums" associated with the gray level of a picture element occupying the order of $j$.

A quotient arrived at by dividing said aggregate $\sigma_j$ of gray level differences by a number $l_j$ of picture elements constituting the group $C_j$ may be expressed as follows:

$$\alpha_j = \sigma_j / l_j \quad (5)$$

The quotient $\alpha_j$ means the average total of differential sums with respect to a picture element having a gray level $j$.

Now let the probability of occurrence of said gray level $j$ be indicated by $P_j$. Then an expected value $\beta_j$ of the average total of differential sums may be determined as follows by multiplying said average by the probability $P_j$:

$$\beta_j = P_j \cdot \alpha_j \quad (6)$$

Said probability $P_j$ can be determined according to the kind of an object outline where the expected value $\beta_j$ is determined for all gray levels $j = 1, 2 \ldots 0$, then a histogram of $\beta_j$ is obtained. A maximum value selected from said histogram represents a maximum value of an average total of differential sums with respect to the pattern $X$. The gray level represented by said expected value is shown to be a suitable threshold value by which to determine an object outline from an observed pattern in terms of the gray level.

The probability of occurrence of the aforesaid gray level $P_j$ in the above Equation (6) may be substituted by the number $l_j$ of picture elements constituting the group $C_j$ which bears a proportionate relationship to said probability $P_j$. Therefore, the following equation results from the above equations (5) and (6)

$$\beta_j = \sigma_j \quad (7)$$

Namely, the total itself of differential sums associated with a given gray level can be taken as an expected value of the average total of differential sums of said gray level. If, therefore, a total of differential sums instead of its expected value $\beta_j$ is determined for each gray level and there is selected from the resultant histogram that gray level which indicates a maximum total of differential sums, then said gray level can be taken as an optimum threshold level in the sense that the average primary differential sum of the region R of a limited two dimensional pattern will have a maximum expected value.

The foregoing description also applies to the secondary differential sum. The secondary differential sum $S_i''$ may be expressed by the following Equation 8 or 8′ with reference to FIG. 2:

$$S_i'' = [(x_i^1 - x_i) - (x_i - x^5_i) + (x_i^7 - x_i) - (x_i - x_i^3)]$$
$$= [(x_i^l + x_i^3 + x_i^5 + x_i^7) - 4x_i] \quad (8)$$

$$S_i'' = [4x_i - (x_i^l + x_i^3 + x_i^5 + x_i^7)] \quad (8)'$$

Since the secondary differential sum $S_i''$ is a function of the gray level $x_i$, determination of said sum $S_i''$ of various matrices in which the same picture element constitutes the central one gives from the above Equation (4) a total $\sigma_j$ of said sum $S_i''$ with respect to the gray level represented by said central picture element. If, therefore, a histogram is prepared, as in the case of the primary differential sum $S_i'$, from a plurality of totals $\sigma_j$ of differential sums obtained from numerous matrices in which different picture elements constitute the central one and a maximum value is selected from said histogram, then said maximum value may obviously be taken as a maximum expected value of the average secondary differential sum.

DESCRIPTION OF THE PREFERRED EMBODIMENTS

There will now be described by reference to FIG. 1 the case of treating a microscopic photograph of a cell as a pattern containing an object of observation. It will be noted, however, that the apparatus of this invention is not limited to such application but may be used in treating other general patterns.

Detection of cancerous cells from among normal ones has hitherto been effected by physician's observation of numerous colored microscopic photographs one by one. Distinction of cancerous cells from normal ones is carried out mainly on the basis of, for example, cellular forms or the shape, size and gray level of cellular nuclei. To perform such work automatically, it is necessary to detect and single out from a microscopic photograph that portion which indicates a cellular section alone. FIG. 1 is a microscopic photograph of the Papanicolaou colored cells of the neck section of a womb where more than 90 percent of womb cancers are known to take place. The central region of FIG. 1 is a cell, the black portion is its nucleus and the surroundings denote a cellular substance.

Figures 1, 2:
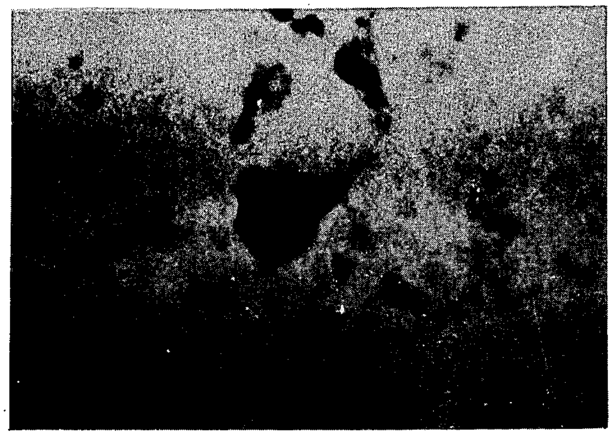
FIG. 1 is a microscopic photograph of a cell which was used as an original pattern indicating an object of observation being treated by the apparatus of this invention.
FIG. 2 presents a 3 × 3 matrix form in which there are arranged nine picture elements having different gray levels.
Figure 3:
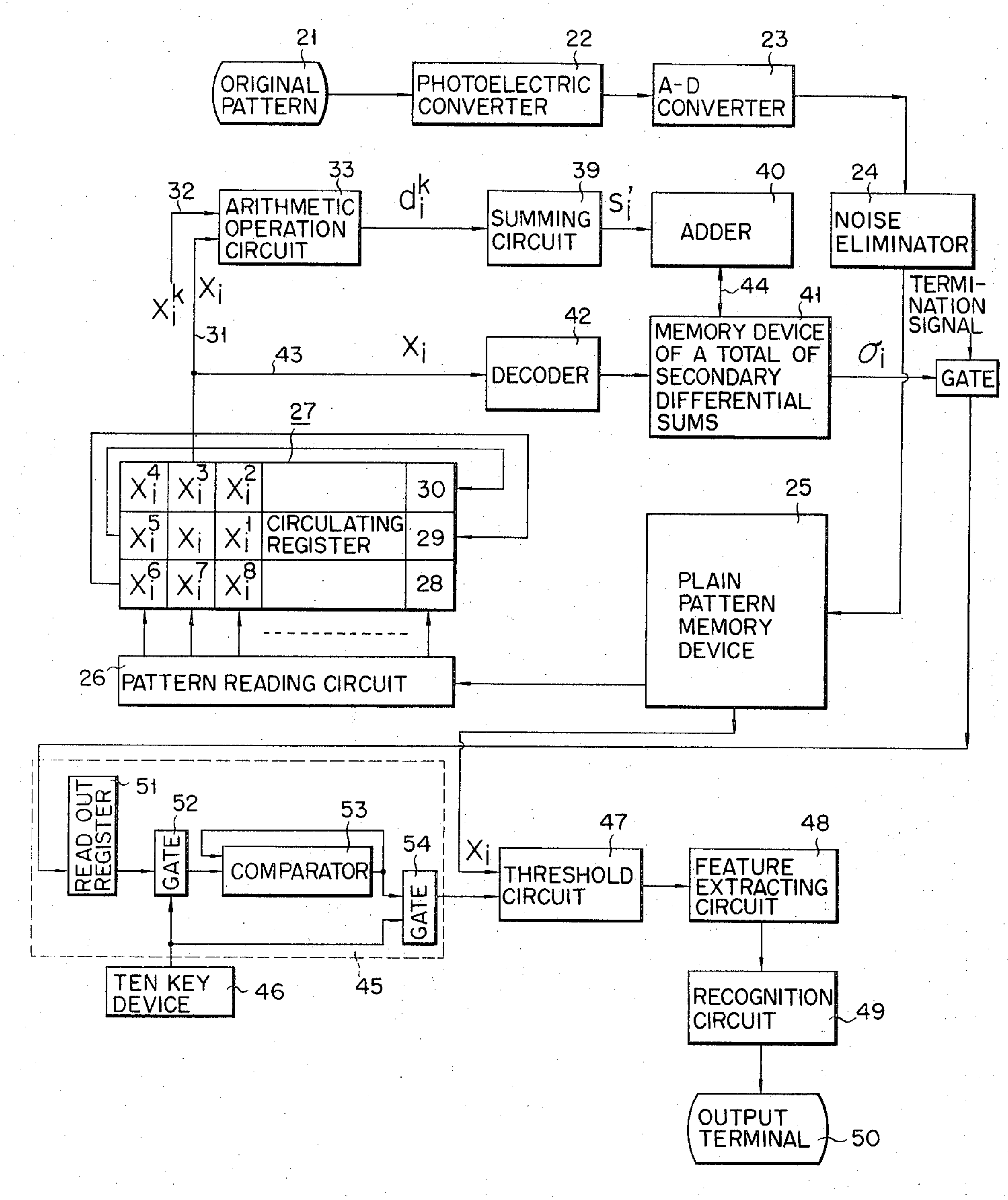
FIG. 3 is a block circuit diagram of a pattern treating apparatus according to an embodiment of this invention.

Now referring to FIG. 3, the original pattern of FIG. 1 is divided into fine picture elements by a photoelectric converter 22 like a flying spot scanner or vidicon. Each picture element is converted into an electric signal corresponding to its gray level. Said photoelectric converter consists of the type set forth particularly in an article entitled "FIDAC-film input to digital automatic computer" by T. Golab, R.S. Ledley and L.S. Rotolo on page 127 of a journal "Pattern Recognition" Vol. III, No. 2, 1971. Outputs from said photoelectric converter 22 are supplied to an analog-digital converter 23 (hereinafter referred to as an "A-D converter") to be converted into digital data on the gray levels of the picture elements which are quantized to 64 (0 to 63) unit steps. Outputs from the A–D converter 23 are conducted, if necessary, to a noise eliminator 24 where noise data other than those on an object outline are removed. To this end, it is possible to use a known noise eliminator, for example, the type set forth in a paper entitled "Pattern Detection and Recognition" by S.H. Unger, PROC. IRE, Vol. 47, Oct., 1959, pp. 1737–1752. This noise eliminator is designed to convert outputs from the A–D converter into binary data by treating them with reference to a proper threshold level, single out only a fully continuous outline larger than a prescribed size whose defective portions, if any, are previously replenished by, for example, a line-supplementing circuit, produce a masking signal associated with said continuous outline and again treat the original outputs from the A–D converter with said masking signal. Digital output data from the noise eliminator 24 on the gray levels of the respective picture elements are stored in a plain pattern memory device 25.

Figure 4:
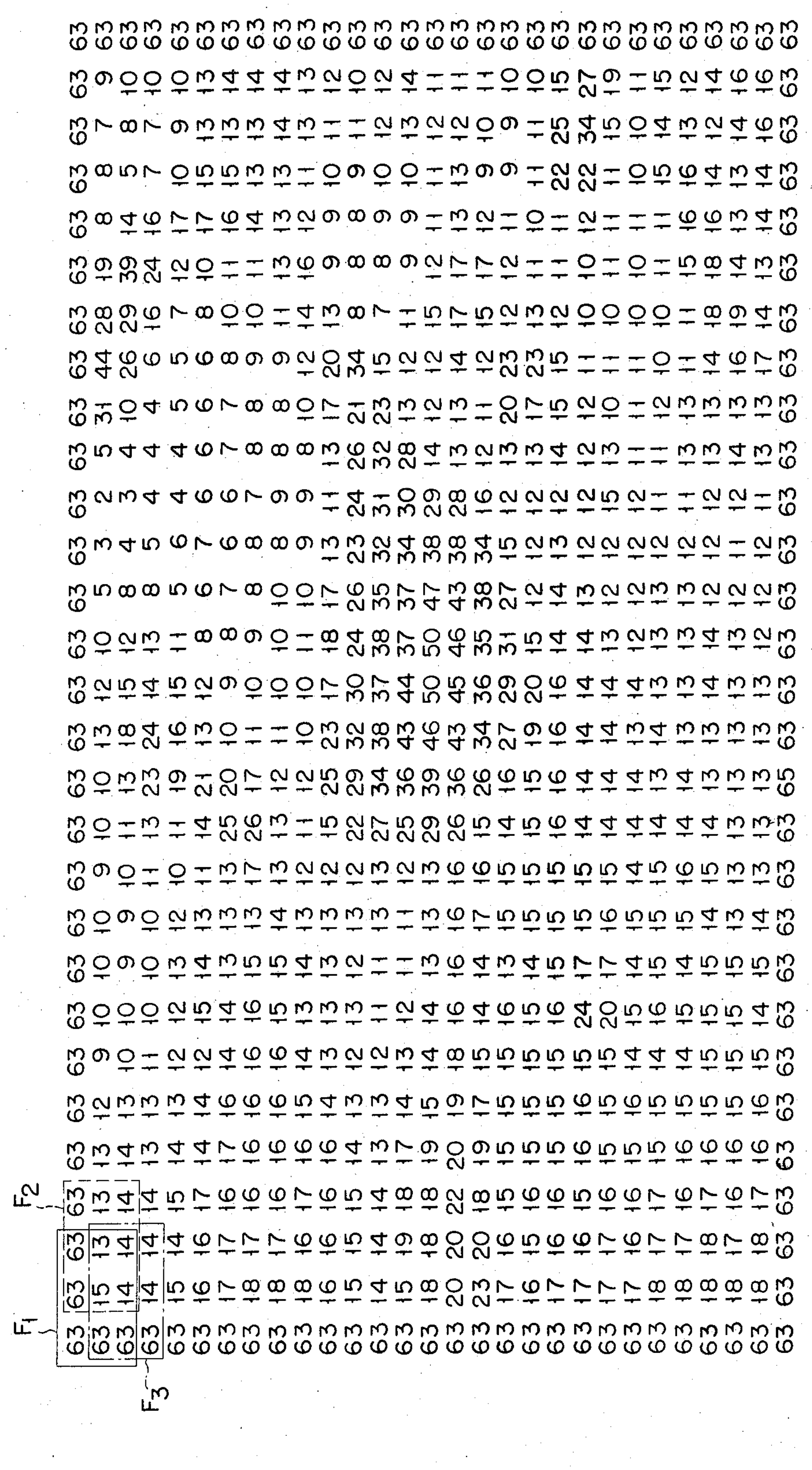
FIG. 4 indicates data stored in the plain pattern memory device of the present apparatus with respect to the gray levels of the original pattern, said data being given in decimal numbers of 0 to 63.

Data stored in said memory device 25 on the gray levels of the original pattern of FIG. 1 are presented in FIG. 4. While, in FIG. 4, said gray level data are expressed in decimal members of 0 to 63, there are actually stored binary values of, for example, six bits. Data of the memory device 25 are drawn out (i.e., read out) by a readout circuit 26 one line after another starting with the topmost one, and data thus drawn out are conducted to a circulating register 27. This circulating register 27 comprises three shift registers 28, 29 and 30 (FIG. 3) and has its data shifted from the right to the left through said three shift registers 28, 29 and 30 upon receipt of a shift pulse from a separately provided shift pulse generator (not shown). Namely, an output from a first shift register 28 is supplied to the input terminal of a second shift register 29, an output from which is in turn conducted to the input terminal of a third shift register 30. Gray level data of the first line of FIG. 4 stored in the first shift register 28 are shifted through the second shift register 29 to the third shift register 30. Data of the second line of FIG. 4 are conducted to the second shift register 29, and data of the third line are carried to the first shift register 28. Thus the circulating register 27 is stored with the gray level data of said first, second and third lines of the plain pattern memory device 25.

Since gray level data consists of binary digits of six bits, each of the shift registers 28 to 30 actually requires its units to consist of six bits respectively. To avoid complication of the drawing, however, FIG. 3 presents the units which are respectively assumed to consist of only one bit. The following description is based on this assumption.

When the circulating register 27 is stored with the gray level data of three lines of the memory device 25, shifting is brought to an end. At this time, a signal denoting the gray level $x_i$ of the central picture element of a 3 × 3 matrix of noise picture elements shown on the left side of the circulating register 27 is supplied through a conductor 31 to an arithmetic operation circuit 33. On the other hand, data on the gray levels $x_i^1$ to $x_i^8$ of the eight picture elements surrounding the central one are carried through a conductor 32 to said arithmetic operation circuit 33. Actually, eight conductors 32 are provided to meet the eight gray levels $x_i^1$ to $x_i^8$. To avoid complication of the drawing, however, a single conductor 32 is indicated as an example.

A group of nine picture elements arranged in the form of a 3 × 3 matrix is enclosed in, for example, a frame $F_1$, $F_2$ or $F_3$ of FIG. 4. Referring to the frame $F_1$, the gray level $x_i$ of the central picture element of said matrix is indicated by a decimal number 15, the gray level $x_i^1$ of one of the surrounding picture elements by 13 and the gray level $x_i^5$ of another surrounding picture element by 63.

The arithmetic operation circuit 33 is intended to calculate a primary differential value $d_i^k$. Said calculation is made by either by Equation 2 or 2′ according as the gray level $x_i$ has a larger or smaller value than the gray level $x_i^k$. The primary differential values $d_i^1$ to $d_i^8$ obtained by the arithmetic operation circuit 33 are supplied to a summing circuit 39 where calculation indicated by the Equation 3 is made to obtain a primary differential sum $S_i'$, that is, a sum of the primary differential values $d_i^1$ to $d_i^8$. Said primary differential sum $S_i'$ is supplied to an adder 40, which, when supplied with input data, actuates a readout circuit (not shown) included in a memory device 41 for storing a total of differential sums associated with the gray level represented by the central picture element of each matrix. Said memory device 41 is provided with 64 addresses designated as 0 to 63 to match the number of the quantized gray levels of a plain pattern. An output from a decoder 42 specifies an address corresponding to a given gray level associated with the gray level $x_i$. The address specified by the decoder 42 has its data drawn out from the memory device 41 by a readout circuit and supplied to an adder 40 through a line 44. In the adder 40, there are added together an output from the summing circuit 39 and the data of the specified gray level adress. The result of said addition is stored in the original address by being conducted thereto through the line 44.

When a primary differential sum associated with the gray levels represented by the picture elements of a 3 × 3 matrix falling within, for example, the frame $F_1$ is stored in that address of the memory device 41 for storing a total of differential sums which corresponds to the gray level of the central picture element 15 of said frame $F_1$, then the shift registers 28 to 30 constituting the circulating register 27 are shifted one bit respectively and then brought to rest. When this condition is reached, the 3 × 3 matrix on the left side of the circulating register 27 is supplied with data on the gray levels of the picture elements enclosed in the frame $F_2$. As in the preceding case, calculation is made of a differential value and a primary differential sum with respect to the gray level of the central picture element 13 of the frame $F_2$. The results of all said calculations are stored in that address of the memory device 41 which corresponds to the gray level of the central picture element 13.

When the above-mentioned operation is repeated until gray level data stored on the extreme right side of the circulating register 27 are brought to the extreme left side thereof, then data on the gray levels of the second line of FIG. 4 are shifted to the third shift register 30, data on those of the third line to the second shift register 29 and data on those of the fourth line to the first shift register 28. Then said shifting is brought to an end. When this condition is reached, the 3 × 3 matrix on the left side of the circulating register 27 is stored with data on the gray level of the central picture element 14 and those of the surrounding picture elements enclosed in the frame $F_3$ of FIG. 4. The same arithmetic operation as in the preceding case is carried out with respect to the gray levels of all the picture elements of said frame $F_3$. The results of said arithmetic operation are stored in that address of the plain pattern memory device 25 which corresponds to the gray level of the central picture element 14 of the frame $F_3$.

Figure 5:
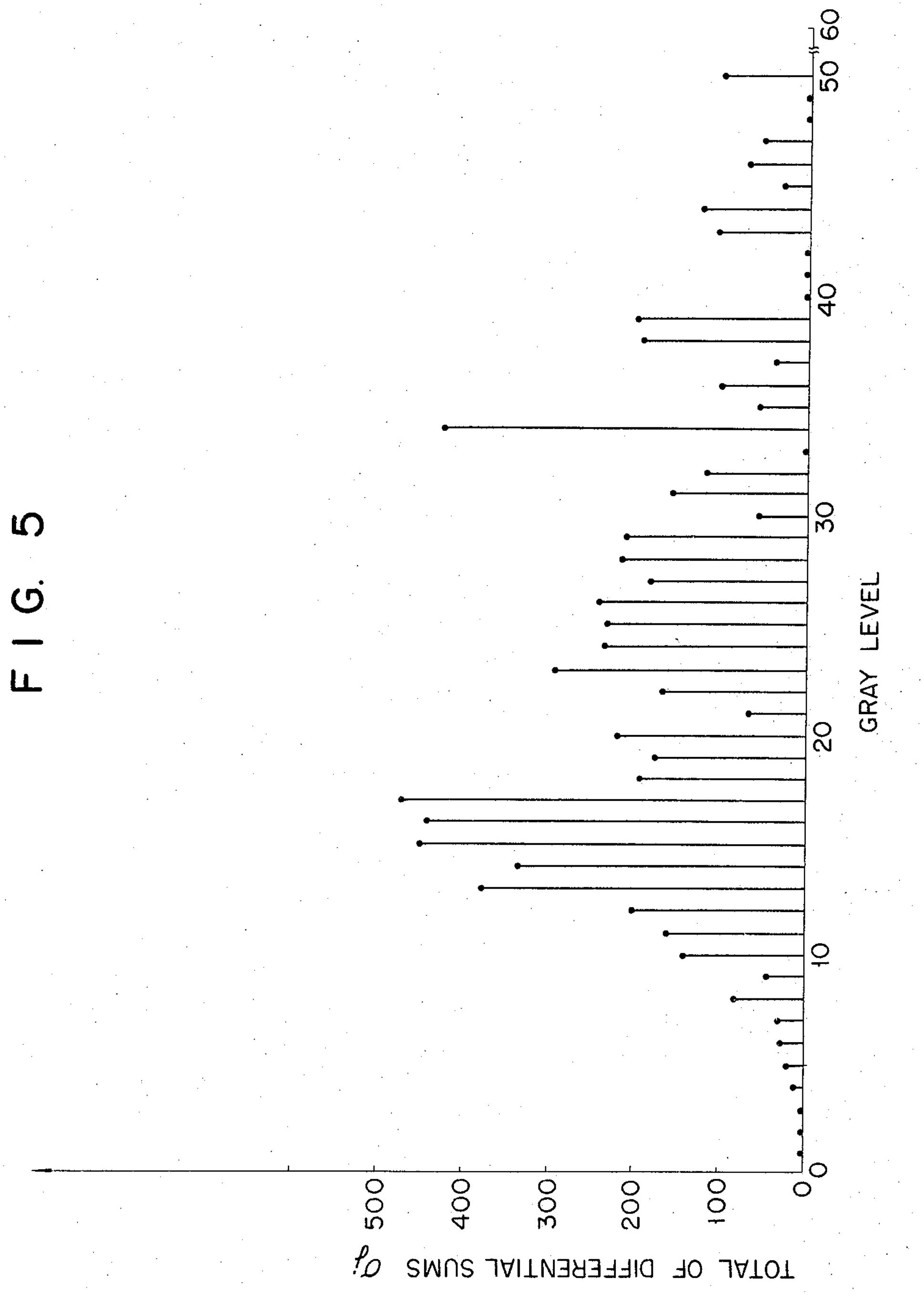
FIG. 5 is a histogram prepared by classifying the various gray levels of the original pattern stored in said plain pattern memory device according to the frequency of their occurrence.

The aforementioned pattern treatment is carried out with respect to gray level data stored in said memory device 25, that is, the gray levels indicated on all lines of FIG. 4 to obtain the primary differential sums of the respective picture elements of a plain pattern. Namely, the primary differential sums associated with various matrices or frames are totaled and stored in the memory device 41 for storing a total of differential sums. Said totaling is carried out with respect to numerous matrices or frames. Thus is obtained the gray level histogram of FIG. 5 which represents the form of data stored in the memory device 41 with respect to the gray levels indicated on all lines of FIG. 4. Said histogram indicates the data stored in said memory device 41 in the form of a linear graph with gray levels plotted on the abscissa and a total $\sigma_j$ of differential sums on the ordinate. The histogram of FIG. 5 shows that some gray levels have maximum or peak values of said total $\sigma_j$, namely, the gray levels marked as 17 and 34 have peak values. Presence of a plurality of such peak values means that the original pattern 21 indicates a prominent gray level at the regions of said peak values. Therefore, it is advised to use said peak values as threshold values in singling out an object outline from the original pattern. A microscopic photograph of cells of FIG. 1 shows that the cellular nucleus has a higher gray level than the surrounding cellular substance, and that both gray levels present an approximately distinct distribution. Therefore, detection of an object outline may be effected by selecting as threshold values those of the gray levels falling within the distribution which bear the aforesaid peak values.

Data stored in the memory device 41 with respect to the gray levels 0 to 63 are successively drawn out to a peak value detection circuit 45 which is so designed as to compare, for example, two gray levels and retain the higher one and, after examining the magnitudes of the gray levels of 0 to 63 by comparison, store a gray level having a maximum value and supply, when required, said maximum gray level to the following object outline detection circuit 47. The peak value detection circuit 45 is supplied with an output from a memory device 46 of a parameter. A parameter thus supplied defines a gray level range from which it is necessary to detect a gray level having a peak value. Now let it be assumed that said parameter is of such type as specifies addresses (or gray levels) from 0 to 30. Then there are drawn out from the memory device 41 data on the gray levels stored in the addresses from 0 to 30. At this time, the peak value detection circuit 45 produces an output representing the gray level designated as 17 in FIG. 5. If a parameter supplied from its memory device 46 specifies addresses from 30 to 63, then the peak value detection circuit 45 will give forth an output denoting the gray level marked as 34 in FIG. 5. These ranges of addresses respectively correspond to the distribution of gray levels in the cellular substance and that of gray levels in the cellular nucleus of FIG. 1. If said parameter memory device 46 is previously stored with such a parameter as meets the object outline of an original pattern, then it will be possible to determine suitable threshold values for those portions of said object outline in which the gray level varies stepwise The peak value detection circuit 45 consists, as shown in FIG. 3, of a readout register 51 for drawing out data from the memory device in the sequential order of the addresses, a comparator 53 supplied through a gate 52 with data read out by the readout register 51 and a gate 54 supplied with an output from the comparator 53. The gate 52 is supplied with inputs representing addresses falling within the range of gray levels being detected, from the parameter memory device 46, for example, a ten key device used in an electronic desk top calculator. For example, where addresses from 0 to 30 are specified, the gate 52 is so designed as to selectively permit the passage of data of said addresses from 0 to 30 alone. The comparator 53 has its output fed back to one of its input terminals and selects data denoting a higher gray level from among successively supplied input data. Thus data of an address (or gray level) corresponding to a maximum value within the specified range of addresses are supplied to the threshold circuit 47 with said range gated by the gate 54 by data on the terminal address of said range previously supplied to said gate 54.

Figure 6:
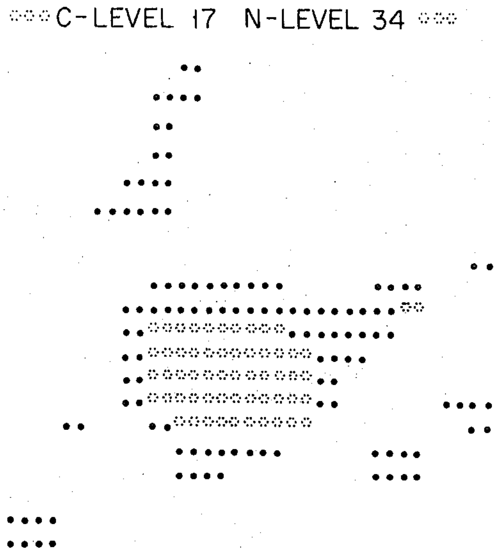
FIG. 6 illustrates the form of an output from a threshold circuit included in the arrangement of FIG. 3.
Figure 7:
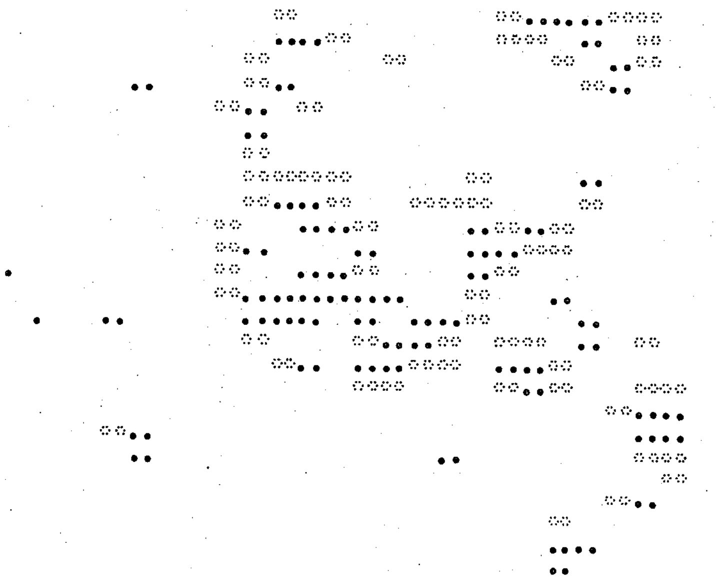
FIG. 7 shows an object outline detected and singled out from the original pattern of FIG. 1 by means of the prior art spatial differentiation process.

An output signal from the peak value detection circuit 45 is conducted as a required threshold value from the gate 54 to the threshold circuit 47, which is supplied with the data of the plain pattern memory device 25 in succession and only gives forth data on gray levels having a larger value than said threshold value. The threshold circuit 47 may consist of the known means consisting of, for example, a comparator and gate coupled together. Outputs from the threshold circuit 47, if indicated in the two-dimensional form, will take a pattern shown in FIG. 6. The dots of FIG. 6 show those sizes of picture elements having a higher gray level than a threshold value represented by the gray level marked as 17 which have been extended two fold only in a horizontal direction. The asterisks of FIG. 6 denote those sizes of picture elements having a higher gray level than a threshold value represented by the gray level marked as 34 which have been extended similarly two fold only in a horizontal direction. The same object outline as in FIG. 6 has been detected and singled out from the original pattern 21, using the conventional secondary differentiation process, the results being presented in FIG. 7. Comparison of both FIGS. 6 and 7 clearly shows that an object outline singled out by the pattern treating apparatus of this invention far more distinctly indicates the cellular nucleus than has been possible with the prior art.

Outputs from the threshold circuit 47 are further supplied to a feature extraction circuit 48 to define the overall feature of an object outline. Output signals from said circuit 48 denoting the extracted feature are conducted to a recognition circuit 49 to be compared with data representing a differential object outline previously stored therein, thus effecting the final recognition of an object outline treated. The result of said recognition is conducted to a device 50 for indicating such a treated object outline as shown in FIG. 6. The feature extraction circuit 48 and recognition circuit 49 may consist of the known types, namely, those which use in an intact state input data corresponding to numerous gray levels or those which first treat input data by a proper threshold value and convert the data thus treated into binary signals in detecting an object outline.

Said feature extraction circuit 48 and recognition circuit may concretely consist of those set forth in a paper entitled "Leukocyte Pattern Recognition" by J.W. Bacus et al, IEEE Trans., Vol. SMC-2, No. 4, Sept., 1972, pp. 513–526 or an article entitled "Automatic Analysis of Cell Images by TICAS" by G.L. Wied, pp. 195–384 appearing in a book entitled "Automated Cell Identification and Cell Sorting" edited by G.L. Wied et al., Academic Press, 1970.

Figure 8:
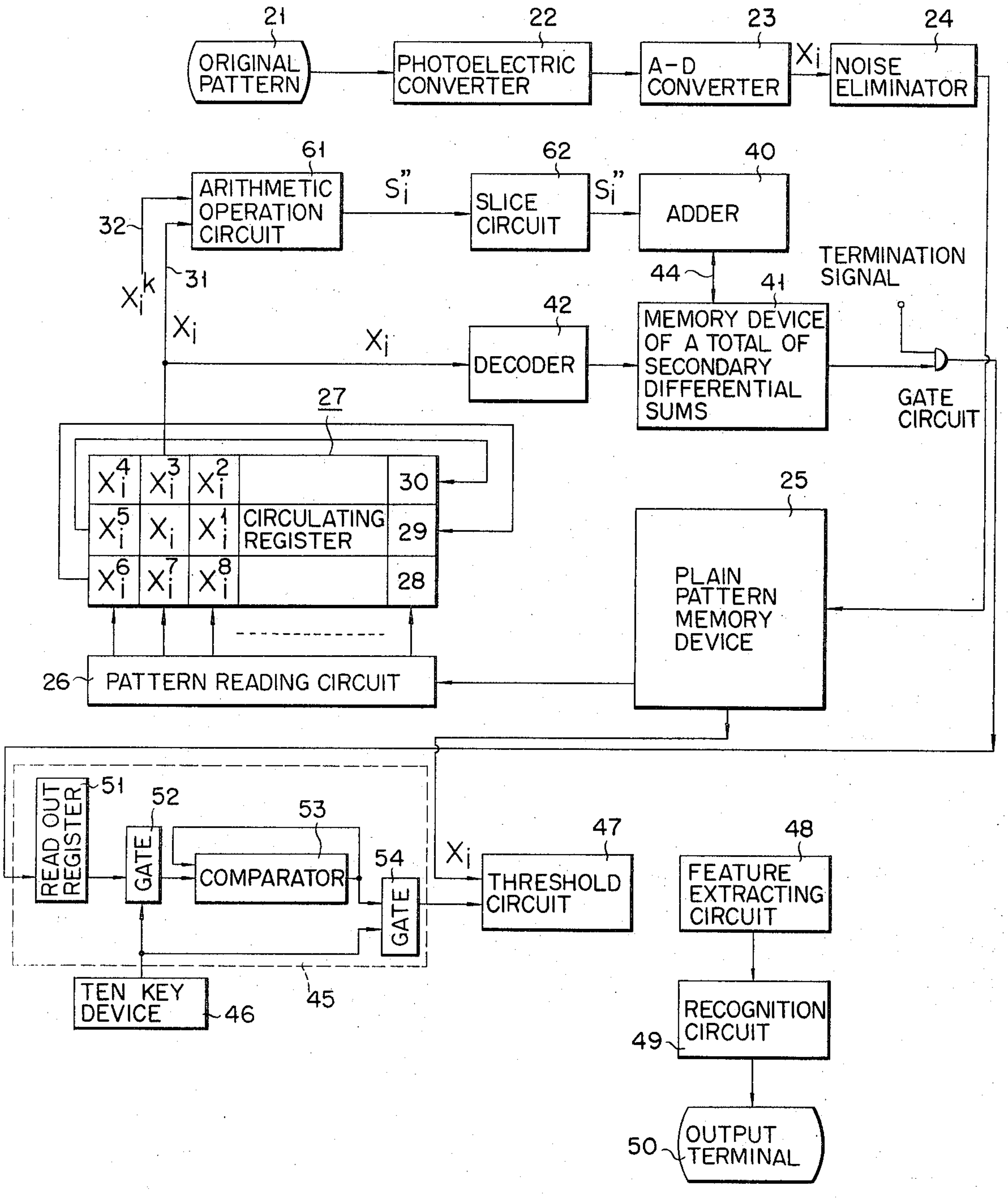
FIG. 8 is a block circuit diagram of a pattern treating apparatus according to another embodiment of the invention.
Figures 9A, 9B, 9C:
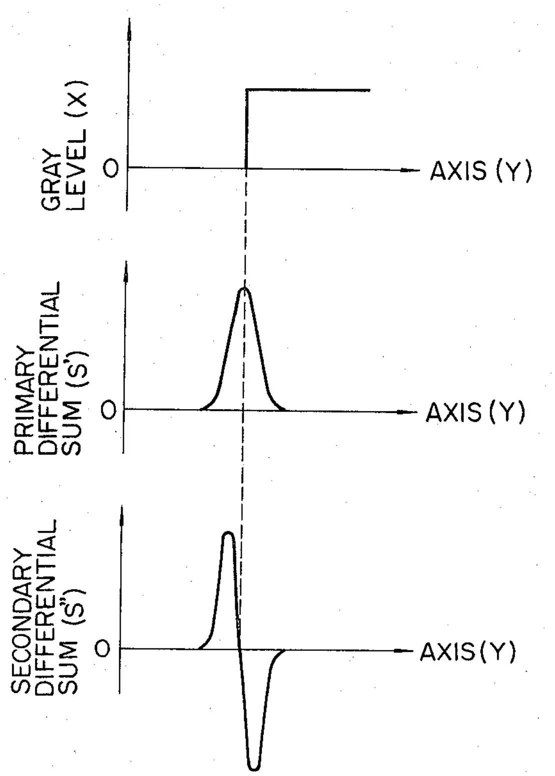
FIGS. 9A to 9C present signal wave forms by way of illustrating the operation of the apparatus of FIG. 8.

Now referring to FIG. 8, the parts the same as those of FIG. 3 are denoted by the same numerals, description thereof being omitted. The apparatus of FIG. 8 is another embodiment of this invention for determining a secondary differential value, and structually differs from that of FIG. 3 in that the arithmetic operation circuit 33 and summing circuit 39 of FIG. 3 are replaced by an arithmetic operation circuit 61 and a slice circuit 62. The arithmetic operation circuit 61 carries out such arithmetic operation as indicated by the Equation 8 or 8′ with respect to data on the gray levels of picture elements constituting a 3 × 3 matrix shown on the left side of the circulating register 27, thereby providing a secondary differential sum $S_i''$. This arithmetic operation circuit 61 is referred to as a Laplacian operator in the spatial differentiation method. An output from said arithmetic operation circuit 61 indicates positive and negative poles as shown in FIG. 9C in a position where gray levels stepwise vary as illustrated in FIG. 9A. FIg. 9B presents the wave form of an output signal in the case of the primary differential sum. The positive and negative outputs of FIG. 9C are supplied to a slice circuit 62, from which either of said outputs is drawn out to be supplied to a circuit for further treatment. While it is theoretically possible to use either a positive or negative secondary differential sum, the inventor's experiments show that a negative sum gave a better result.

Figure 10A:
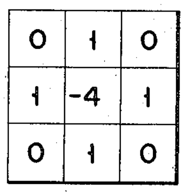
FIGS. 10A and 10B are model representations of the function of an arithmetic operation circuit included in the apparatus of FIG. 8.
Figure 10B:
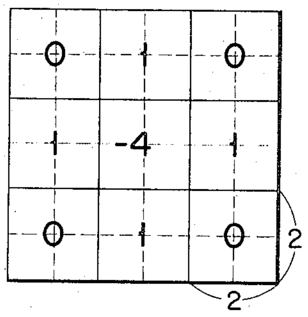

A Laplacian operator for determination of a secondary differential sum may be a type associated with the Equation 8 or 8′ or a type used in the arithmetic operation of FIG. 10B. A Laplacian operator relative to FIG. 10A is used with the equation 8 or 8′. FIG. 10B presents 36 picture elements arranged in a 6 × 6 matrix. The Laplacian operator treats the gray levels of said picture elements taken to constitute a 3 × 3 matrix, each block of which consists of a minor matrix of 2 × 2. Though reduced in the accuracy of detection, the Laplacian operator of FIG. 10B requires less data, enabling easy treatment. The spatial differentiation may be effected by various known processes set forth, for example, in Trans. IECE71/6 Vol. 54–C No. 6, pp. 455–451.

As mentioned above, the pattern treating apparatus of this invention carries out the treatment of an original plain pattern by determining an optimum threshold value, and attains the accurate recognition of a general pattern whose absolute gray level varies or whose outline is indefinite.

This invention is not limited to the aforesaid embodiments, but may be used in treating an output from, for example, the photoelectric converter 22 directly as analog data without subjecting said output to the A–D conversion. Further, this invention is applicable not only to a plain but also to a colored pattern. This invention can be practised with respect to a colored pattern by converting said pattern into a plain type using, for example, filters of three primary colors and dividing the resultant plain pattern into picture elements. In this case, the primary differential sum $d_i^k$ may be expressed as $$d_i^k = \sqrt{\sum_{l=1}^{3} \{d_i^k(l)\}^2} \quad (9)$$

In the above-mentioned embodiments, the expected value $\beta_j$ of the average primary differential sum of the gray level of each picture element was approximately determined by substituting its occurrence probability $P_j$ by a number of $l_j$ of picture elements constituting a fractional group of matrix in which the first mentioned picture element constitutes the central one. Where, however, the occurrence probability $P_j$ is previously known, the threshold value of an original pattern may obviously be defined by a maximum value selected from among the expected values of the gray levels of numerous picture elements determined by the Equations 5 and 6.

What is claimed is:

1. A pattern treating apparatus comprising a photoelectric converter for dividing a two-dimensional plain pattern into numerous picture elements and generating an electric signal corresponding to the gray level of each element, said gray level being divided into a plurality of unit steps between white and black levels of each element; a plain pattern memory device for storing outputs from the photoelectric converter denoting the gray levels of the picture elements of the two-dimensional plain pattern; a readout device for successively reading out from the plain pattern memory device data on the gray levels of a central picture element and surrounding picture elements collectively constituting a matrix; a device for calculating a sum of differences between the gray level of the central picture element and those of the surrounding picture elements of the matrix from outputs of the readout device; a device for calculating a total of differential sums by adding the differential sums thus calculated of various matrices in which the picture elements with the same gray level constitute the central ones; a memory device for storing the total of differential sums; a device for successively reading out data from the memory device and detecting the gray level of the picture element having a maximum value of the total of differential sums from outputs of the memory device; and threshold circuit for slicing the gray level of said data using said detected gray level as a threshold value for reading out a desired gray level from the plain pattern memory device.

2. The pattern treating apparatus according to claim 1 wherein the device for successively reading out the gray levels of picture elements constituting a matrix includes a circuit for reading out gray level data stored in the plain pattern memory device one line after another, a circulating register formed of a plurality of shift registers for temporarily storing data on the gray levels of picture elements included in a plurality of lines when said data are readout by the readout circuit and a device for supplying the input terminal of the differential sum computing device with gray level data stored in the respective stages of the shift registers collectively constituting a prescribed matrix on the output side of the circulating register.

3. The pattern treating apparatus according to claim 2 wherein the circulating register has three shift registers for temporarily storing data on the gray levels of picture elements included in three lines on the data stored in the plain pattern memory device and is arranged such that data stored in the respective stages of the shift registers collectively arranged in a 3 × 3 matrix on the output side thereof are supplied in parallel to the device for calculating a differential sum.

4. The pattern treating apparatus according to claim 1 wherein the differential sum calculating device includes an arithmetic operation circuit for calculating a primary differential sum and a summing circuit for adding the differential sums thus calculated with respect to various matrices in which the same picture element constitutes the central one.

5. The pattern treating apparatus according to claim 1 wherein the differential sum calculating device has an arithmetic operation circuit for calculating a secondary differential value bearing positive and negative poles and a slice circuit for selectively reading out only a secondary differential value of the desired pole.

6. The pattern treating apparatus according to claim 1 wherein the device for detecting a mawimum total of differential sums includes a memory device for storing a parameter specifying a range of gray levels from which said maximum total is to be detected.

7. The pattern treating apparatus according to claim 1 wherein the device for detecting a maximum total of differential sums includes a readout register for reading out data from the memory device for storing a total of differential sums in the order of the addresses, a first gate supplied with gray level data read out by the readout register, a ten key device for supplying the first gate with the address of a range from which a gray level having a maximum total of differential sums is to be detected, a comparator having one of its input terminals supplied with an output from the first gate and the other input terminal supplied with an output from said comparator itself and giving forth a signal representing the larger one of the two inputs determined by comparison and a second gate which, when supplied with data on the terminal address of a range of gray levels specified by the 10 key device, generates that portion of an output from the comparator which denotes said terminal address.

8. The pattern treating apparatus according to claim 1 wherein the device for storing a total of differential sums associated with the gray level of each picture element includes a decoder for providing an address corresponding to the gray level of said picture element when it constitutes the central picture element of various matrices and causes a total of differential sums calculated by the adder to be stored in the specified address of said memory device according to the address represented by an output from the decoder.

9. The pattern treating apparatus according to claim 1 wherein said matrix is a 3 × 3 matrix pattern consisting of nine picture elements in total, eight of which comprise said surrounding picture elements.

10. The pattern treating apparatus according to claim 1 wherein said plurality of unit steps of gray level comprises 64 unit steps.

* * * * *